United States Patent
Chen et al.

(10) Patent No.: US 8,072,745 B2
(45) Date of Patent: Dec. 6, 2011

(54) RETAINING APPARATUS FOR LOCKING DISK DRIVE

(75) Inventors: Yun-Lung Chen, Taipei Hsien (TW); Hai-Tao Gong, Shenzhen (CN); Rui-Peng Shen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 192 days.

(21) Appl. No.: 12/492,502

(22) Filed: Jun. 26, 2009

(65) Prior Publication Data

US 2010/0149747 A1 Jun. 17, 2010

(30) Foreign Application Priority Data

Dec. 12, 2008 (CN) .......................... 2008 2 0303369

(51) Int. Cl.
*G06G 1/16* (2006.01)
(52) U.S. Cl. .............. 361/679.33; 361/679.37; 361/724; 312/223.1; 312/223.2; 312/333
(58) Field of Classification Search ............. 361/679.33, 361/679.37, 726
See application file for complete search history.

(56) References Cited

U.S. PATENT DOCUMENTS

| | | | | |
|---|---|---|---|---|
| 6,771,496 B1* | 8/2004 | Wu | .......................... | 361/679.58 |
| 6,813,148 B2* | 11/2004 | Hsu et al. | ................. | 361/679.39 |
| 7,035,099 B2* | 4/2006 | Wu | .......................... | 361/679.33 |
| 7,102,885 B2* | 9/2006 | Chen et al. | ............... | 361/679.31 |
| 7,233,490 B1* | 6/2007 | Lai | ............................ | 361/679.33 |
| 7,428,147 B2* | 9/2008 | Lin | ............................ | 361/679.33 |
| 7,471,510 B2* | 12/2008 | He | ............................. | 361/679.33 |
| 7,542,281 B2* | 6/2009 | Liang et al. | ............... | 361/679.39 |
| 7,826,209 B2* | 11/2010 | Chen et al. | ............... | 361/679.37 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A retaining apparatus for locking a disk drive within a bracket is disclosed. The retaining apparatus includes a latch member and a securing member. The latch member includes a securing portion and a locking portion capable of locking the disk drive in the bracket. A resisting piece is formed on the securing member to resist against the latch member to move towards the bracket to block the disk drive from moving out of the bracket.

19 Claims, 7 Drawing Sheets

RETAINING APPARATUS FOR LOCKING DISK DRIVE

BACKGROUND

1. Technical Field

The present disclosure relates to a retaining apparatus and, particularly, to a retaining apparatus for locking a disk drive in a bracket.

2. Description of Related Art

Disk drives and other peripheral electronic components are frequently mounted on a carrier that can be slidably inserted into a chassis. The carrier usually includes a pair of carrier rails positioned on either side thereof to match the chassis rails. A latching mechanism is usually included to latch the disk drive in the carrier. A drawback of current carriers of removable disk drives is their relatively large size. Additionally, the number of parts required to assemble the carriers increases the cost of the disk drive bracket.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
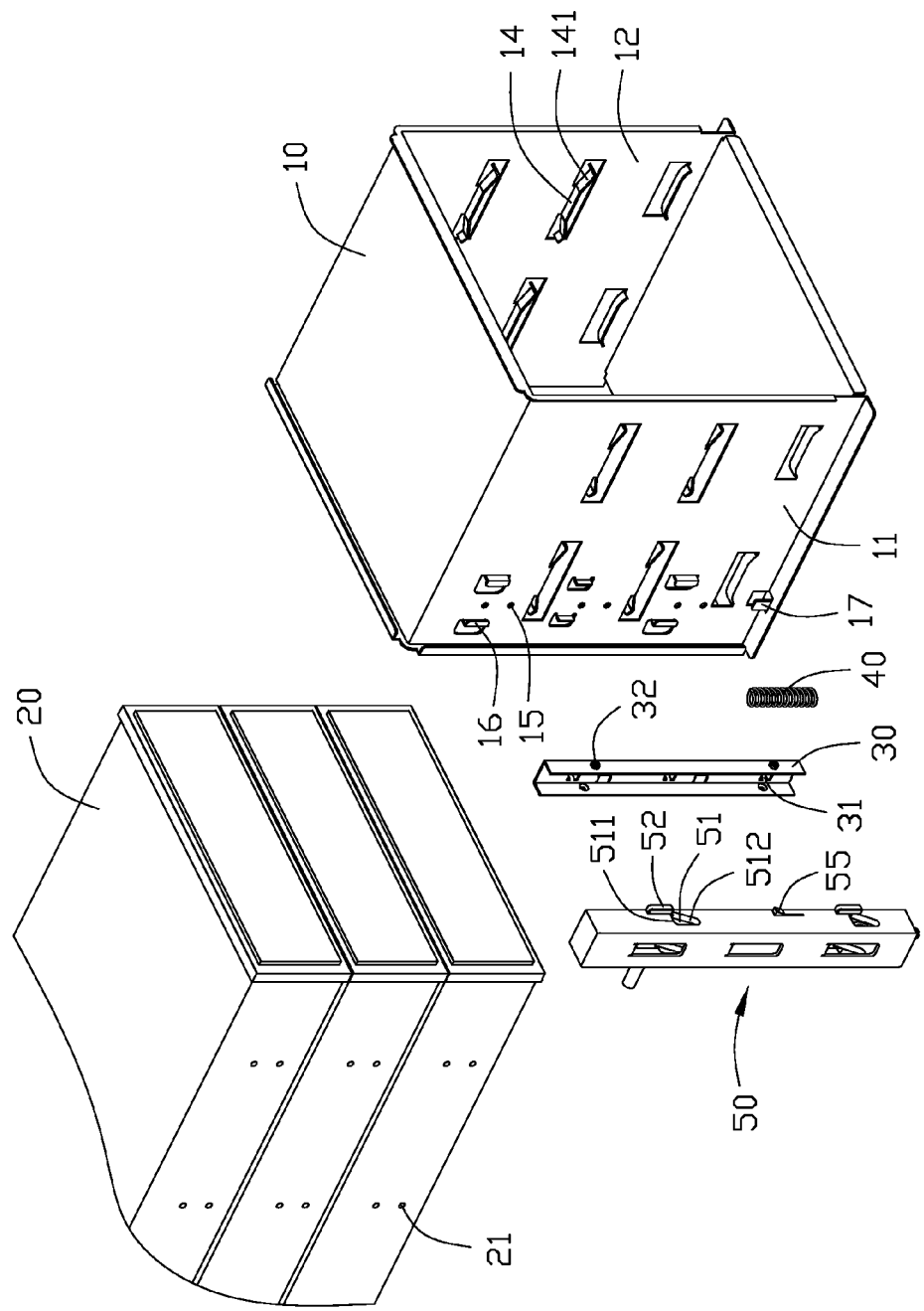
FIG. 1 is an isometric, exploded view of a disk drive and a retaining apparatus.

Referring to FIG. 1, a retaining apparatus includes a bracket 10 for accommodating a plurality of disk drives 20, a latch member 30, an elastic component 40, and a securing member 50. The latch member 30 is capable of locking the disk drives 20. A plurality of mounting holes 21 is defined in a side of each disk drive 20.

The bracket 10 includes two side panels 11, 12. A plurality of parallel guide flanges 14 is formed on the two side panels 11, 12. Opposite ends of each guide flange 14 are bent to form a resilient pressing portion 141. A plurality of holes 15 is defined in the side panel 11 corresponding to the mounting holes 21. A plurality of bent flanges 16 extend from the side panel 11 to form a slideway. A positioning piece 17 projects from a bottom portion of the bracket 10. A plurality of locking portions 31 protrude from a middle portion of the latch member 30. Two securing portions 32 are formed on each side of the latch member 30.

Figure 2:
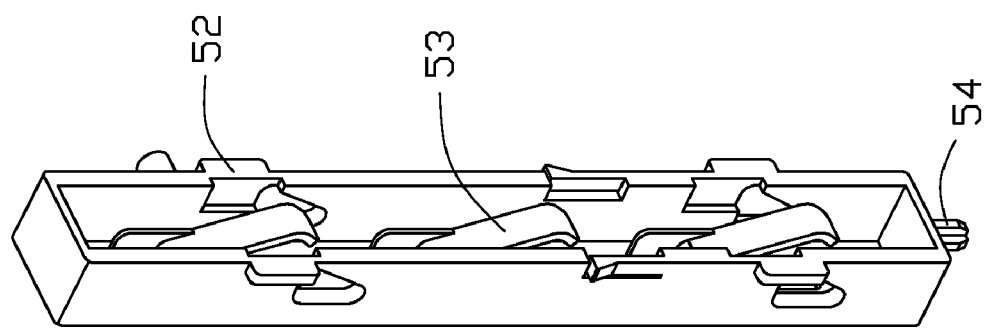
FIG. 2 is an isometric view of a securing member of FIG. 1.

Referring to FIG. 2, a cross section of the securing member 50 is U-shaped. Two slots 51 are defined in a side of the securing member 50. The slot 51 is defined to form a straight edge 511 and a bevel edge 512. A sliding block 52 projects adjacent to the slot 51. A plurality of resisting pieces 53 extends from a middle portion of the securing member 50. A positioning post 54 protrudes from a bottom portion of the securing member 50. A projection 55 is formed on each side of the securing member 50.

Figure 3:
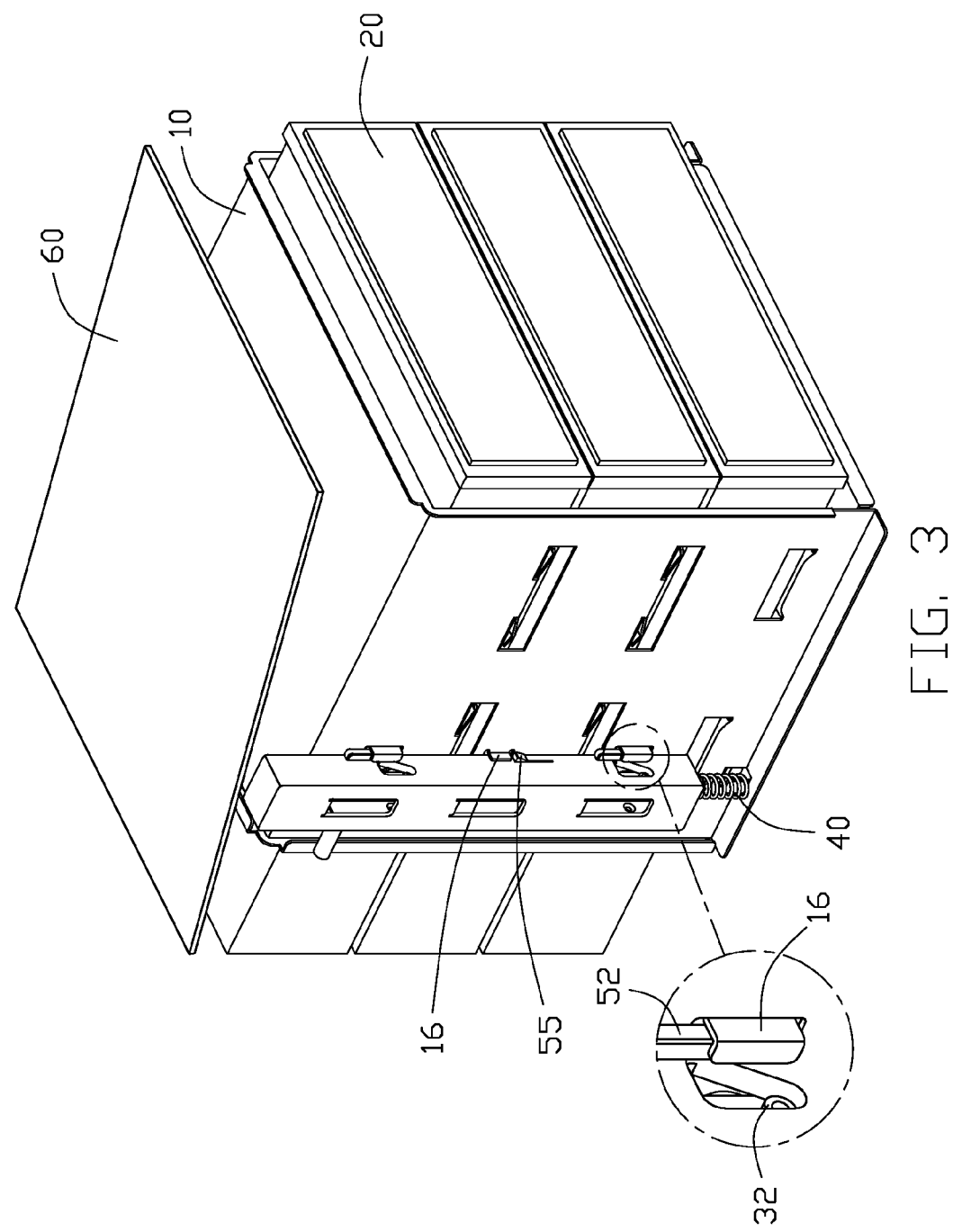
FIG. 3 is an assembled view of the disk drive disengaged from the retaining apparatus.
Figure 4:
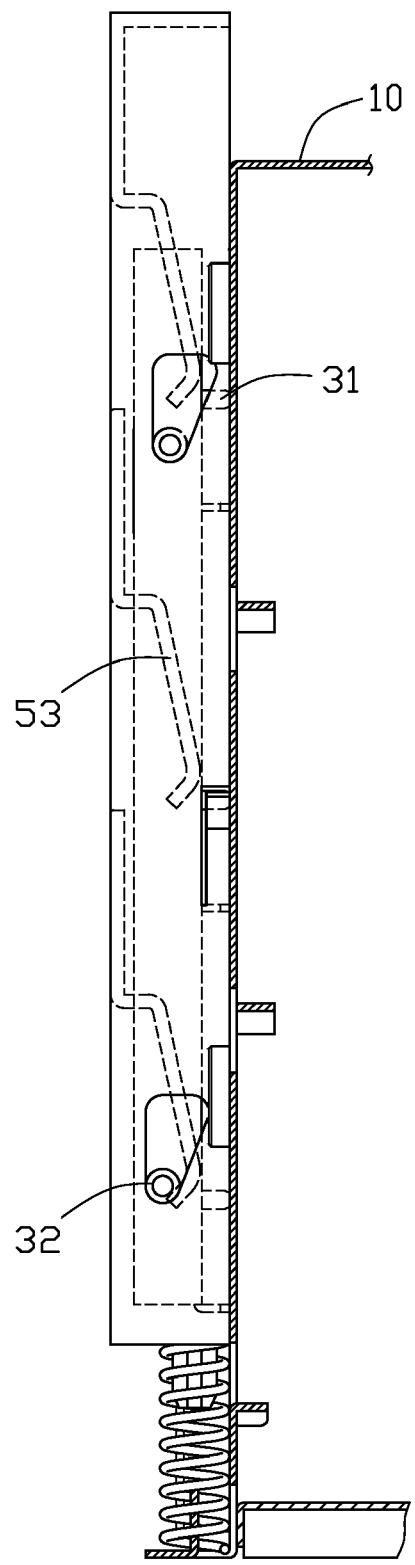
FIG. 4 is a schematic view of FIG. 3.

Referring to FIG. 3 and FIG. 4, three individual disk drives 20 are mounted in the bracket 10. The elastic component 40 is installed around the positioning piece 17. The securing portion 32 is inserted into the slot 51 of the securing member 50. The sliding block 52 is slid into the bent flange 16 of the bracket 10. The positioning post 54 is inserted in the elastic component 40. The securing portion 32 is laid on a bottom portion of the slot 51. The bent flange 16 resists against the projection 55. The bracket 10 is mounted in an electronic device with a cover 60.

Figure 5:
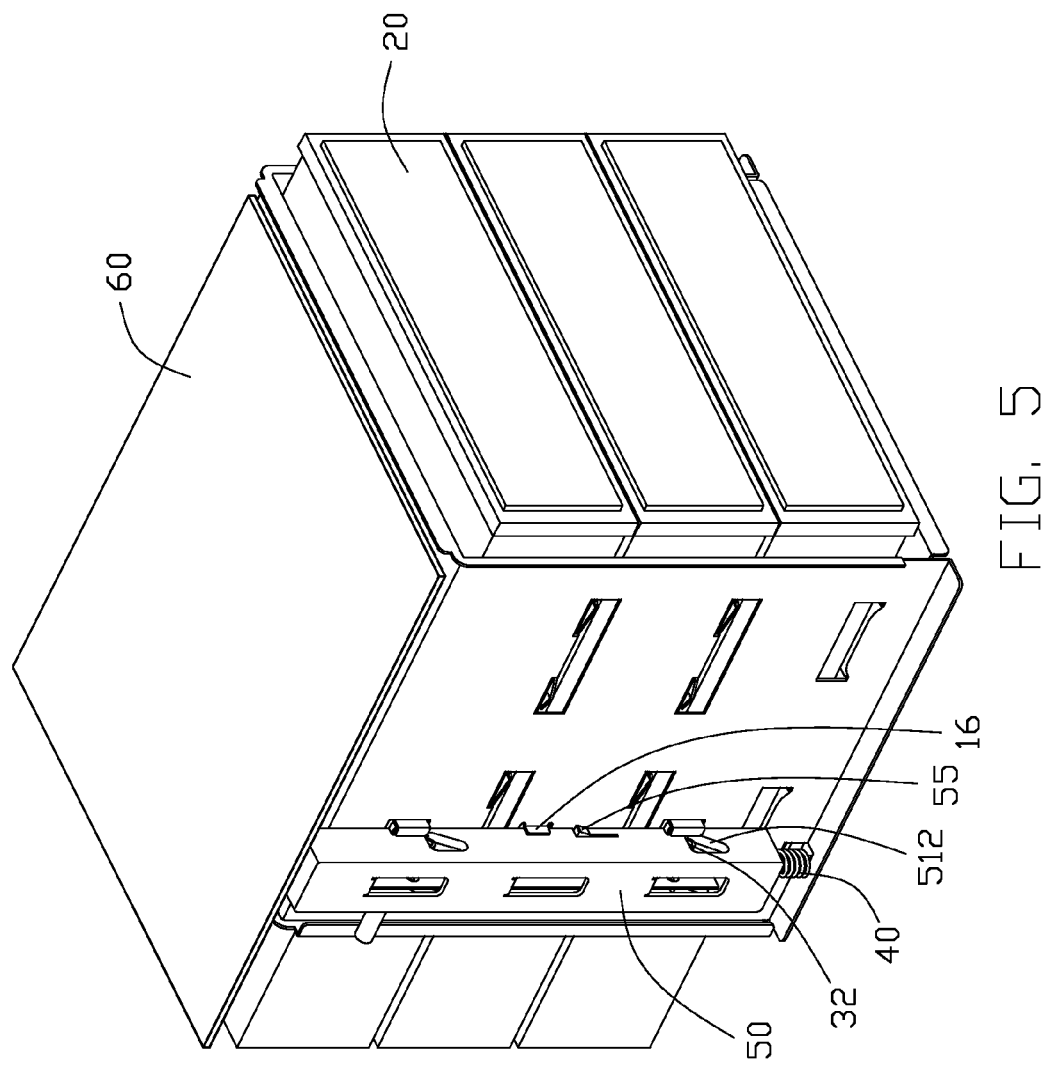
FIG. 5 is an assembled view of FIG. 3.
Figure 6:
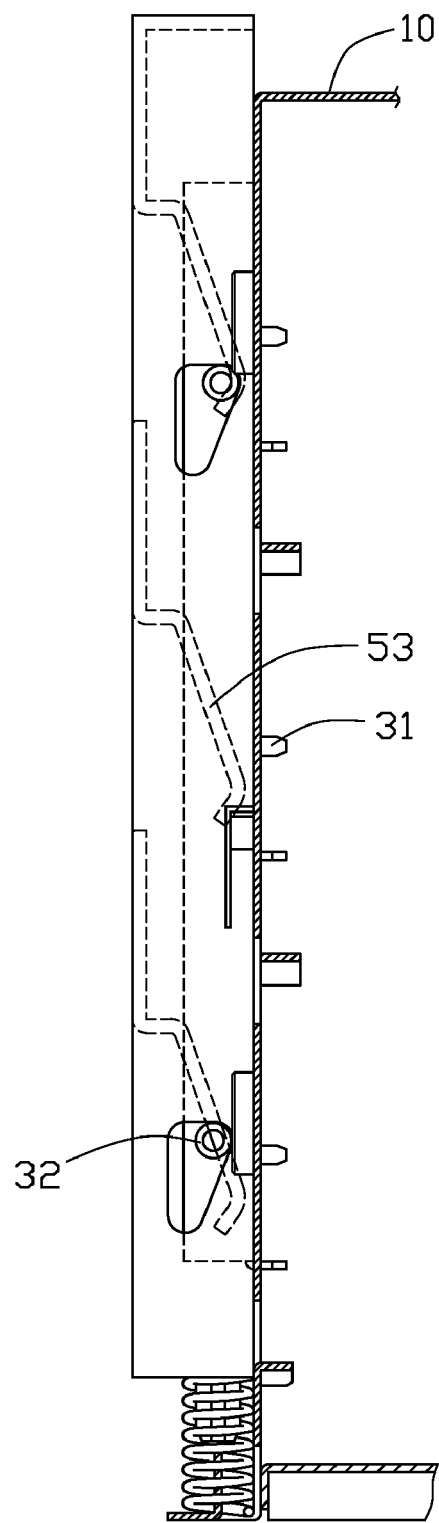
FIG. 6 is a schematic view of FIG. 5.
Figure 7:
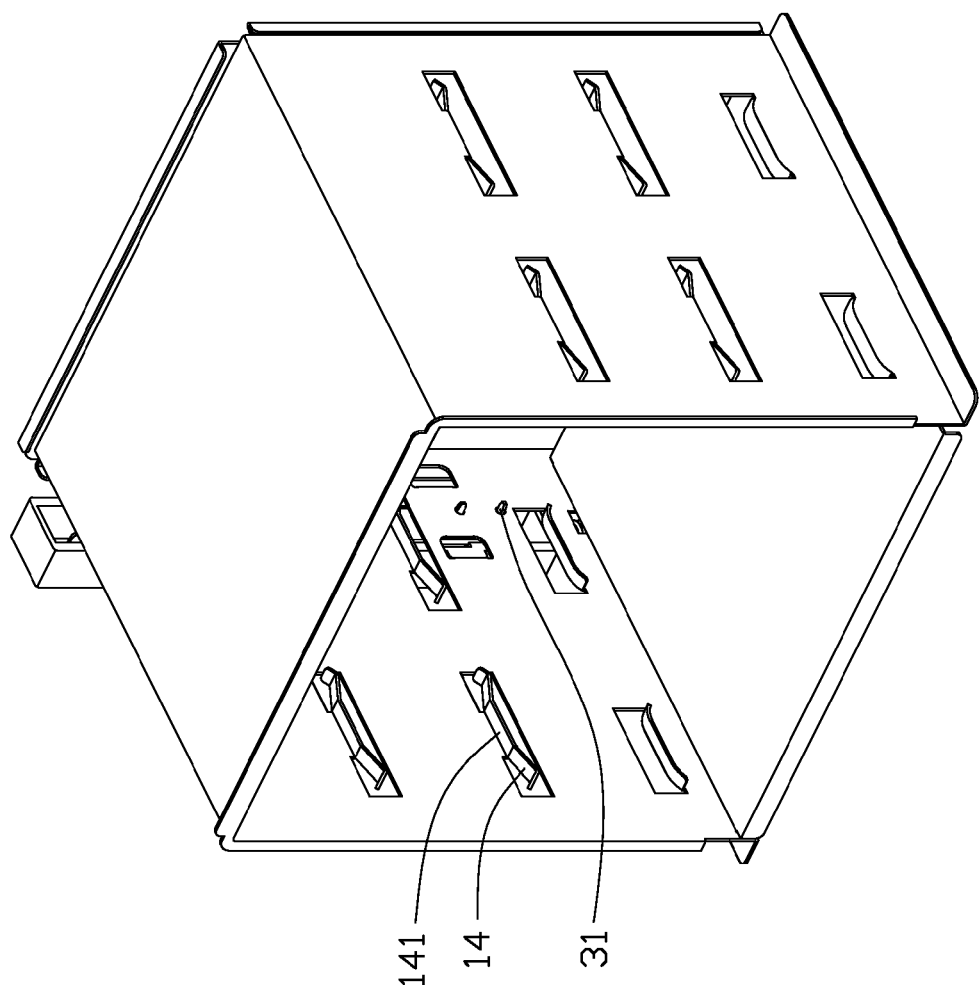
FIG. 7 is similar to FIG. 5, but viewed from another aspect without the disk drive.

Referring to FIG. 5, FIG. 6 and FIG. 7, the cover 60 is closed. The securing member 50 is moved along a first direction. The resisting piece 53 pushes the latch member 30 towards the bracket 10. The locking portion 31 of the latch member 30 is inserted into the mounting hole 21 of the disk drive 20. The securing portion 32 is slid along a top portion of the slot 51 adjacent to the straight edge 511. The elastic component 40 is compressed. The positioning post 54 resists against the positioning piece 17. The disk drive 20 is locked in the electronic device. The disk drive 20 is sandwiched between the corresponding pressing portions 141 and guide flanges 14.

When the cover 60 is removed, the securing member 50 is slid along a second direction by resilient force of the elastic component 40. The bevel edge 512 of the slot 51 pushes the securing portion 32 away from the disk drive 20. The latch member 30 is moved by the securing member 50 along a third direction perpendicular to the first direction. The locking portion 31 is disengaged from the mounting hole 21. The disk drive 20 is detached from the bracket 10.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining assembly, comprising:
   a bracket;
   a latch member, the latch member comprising a locking portion and a securing portion; the locking portion is capable of extending through the bracket to engage mounting holes of a disk drive;
   a securing member capable of moving along a first direction, a slot defined in the securing member to receive the securing portion, wherein the latch member is received in the securing member, and the securing member is capable of urging the securing portion along a third direction perpendicular to the first direction to disengage the mounting holes of the disk drive;
   wherein a positioning piece is located on a bottom portion of the bracket, an elastic component is mounted around the positioning piece to bias the securing member along the first direction.

2. The retaining assembly of claim 1, wherein a bevel edge is formed adjacent to the slot to move the securing portion driving the locking portion of the latch member away from the disk drive.

3. The retaining assembly of claim 1, wherein a plurality of sliding blocks project from the securing member, and a slide way is formed on the bracket to receive the sliding blocks.

4. The retaining assembly of claim 1, wherein a plurality of resisting pieces is formed on the securing member to resist against the latch member.

5. The retaining assembly of claim 1, wherein the bracket comprising two side panels, a plurality of guide flanges are formed on the two side panels; a pressing portion is formed on an end of each guide flange to press the disk drive.

6. The retaining assembly of claim 1, wherein a cross section of the securing member is U-shaped.

7. The retaining assembly of claim 1, wherein a resilient projection protrudes from the securing member; a flange is formed on the bracket to block the projection.

8. A retaining apparatus for locking a disk drive within a bracket, comprising:
- a latch member comprising a securing portion and a locking portion capable of locking the disk drive in the bracket;
- a securing member, movable along a first direction and a resisting piece formed on the securing member to resist against the latch member to move towards the bracket to block the disk drive from moving out of the bracket; and wherein a positioning piece is located on a bottom portion of the bracket, an elastic component is mounted around the positioning piece to bias the securing member along the first direction.

9. The retaining apparatus of claim 8, wherein a slot is defined in the securing member to receive the securing portion.

10. The retaining apparatus of claim 9, wherein a bevel edge is located adjacent to the slot to bias the securing portion away from the disk drive.

11. The retaining apparatus of claim 8, wherein a positioning piece is formed on a bottom portion of the bracket, an elastic component is mounted around the positioning piece to resist against the securing member.

12. The retaining apparatus of claim 8, wherein a plurality of sliding blocks project from the securing member, a slide way is formed on the bracket to receive the sliding blocks.

13. The retaining apparatus of claim 8, wherein the bracket comprising two side panels, a plurality of resilient pieces are formed on the two side panels, and a pressing portion is formed on an end of each resilient piece.

14. The retaining apparatus of claim 8, wherein a cross section of the securing member is U-shaped.

15. The retaining apparatus of claim 8, wherein a hole is defined in the disk drive to accommodate the locking portion.

16. The retaining apparatus of claim 8, wherein a resilient projection protrudes from the securing member, a flange is formed on the bracket to block the projection.

17. A retaining assembly, comprising:
- a bracket;
- a latch member, the latch member comprising a locking portion and a securing portion; the locking portion is adapted to extend through the bracket to engage mounting holes of a disk drive;
- a securing member adapted to move along a first direction, a slot defined in the securing member, and the latch member retained in the securing member with the securing portion extending through the slot; the securing portion restricted in the slot, wherein the securing member is adapted to bias the securing portion towards a third direction that is perpendicular to the first direction, to disengage the locking portion from the mounting holes of the disk drive;
- and wherein a positioning piece is located on a bottom portion of the bracket, an elastic component is mounted around the positioning piece to bias the securing member along the first direction.

18. The retaining assembly of claim 17, wherein a bevel edge is located adjacent to the slot to bias the securing portion away from the disk drive.

19. The retaining assembly of claim 17, wherein a positioning piece is located on a bottom portion of the bracket, and an elastic component is mounted around the positioning piece to bias the securing member along the first direction.

* * * * *